US009824216B1

(12) United States Patent
Khalid et al.

(10) Patent No.: US 9,824,216 B1
(45) Date of Patent: Nov. 21, 2017

(54) SUSCEPTIBLE ENVIRONMENT DETECTION SYSTEM

(71) Applicant: FireEye, Inc., Milpitas, CA (US)

(72) Inventors: Yasir Khalid, Fremont, CA (US); Shivani Deshpande, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 169 days.

(21) Appl. No.: 14/986,428

(22) Filed: Dec. 31, 2015

(51) Int. Cl.
G06F 21/56 (2013.01)
G06F 21/55 (2013.01)
G06F 21/57 (2013.01)

(52) U.S. Cl.
CPC .......... G06F 21/566 (2013.01); G06F 21/554 (2013.01); G06F 21/577 (2013.01); G06F 2221/033 (2013.01)

(58) Field of Classification Search
None
See application file for complete search history.

(56) References Cited

U.S. PATENT DOCUMENTS

| 4,292,580 | A | 9/1981 | Ott et al. |
|---|---|---|---|
| 5,175,732 | A | 12/1992 | Hendel et al. |
| 5,440,723 | A | 8/1995 | Arnold et al. |
| 5,490,249 | A | 2/1996 | Miller |
| 5,657,473 | A | 8/1997 | Killean et al. |
| 5,842,002 | A | 11/1998 | Schnurer et al. |
| 5,978,917 | A | 11/1999 | Chi |
| 6,088,803 | A | 7/2000 | Tso et al. |
| 6,094,677 | A | 7/2000 | Capek et al. |
| 6,108,799 | A | 8/2000 | Boulay et al. |
| 6,269,330 | B1 | 7/2001 | Cidon et al. |
| 6,272,641 | B1 | 8/2001 | Ji |
| 6,279,113 | B1 | 8/2001 | Vaidya |
| 6,298,445 | B1 | 10/2001 | Shostack et al. |
| 6,357,008 | B1 | 3/2002 | Nachenberg |

(Continued)

FOREIGN PATENT DOCUMENTS

| GB | 2439806 A | 1/2008 |
|---|---|---|
| GB | 2490431 A | 10/2012 |

(Continued)

OTHER PUBLICATIONS

Marchette, David J., "Computer Intrusion Detection and Network Monitoring: A Statistical Viewpoint", ("Marchette"), (2001).

(Continued)

Primary Examiner — Michael R Vaughan
(74) Attorney, Agent, or Firm — Rutan & Tucker, LLP

(57) ABSTRACT

A computerized technique wherein a received object is analyzed using a plurality of information sources to determine context information, wherein one information source comprises configuration information determined from a client device. One or more software profiles are generated based on the context information in order to provision one or more virtual machines of a dynamic analysis logic system. One or more work orders are generated based on the one or more software profiles. A priority order is assigned to the one or more software profiles. A dynamic analysis is scheduled based on the work orders and the assigned priority order to determine one or more susceptible software environments, and an alert is generated comprising information to update one or more susceptible environments in real time.

20 Claims, 6 Drawing Sheets

(56) References Cited

U.S. PATENT DOCUMENTS

| | | |
|---|---|---|
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,413,235 B1 | 4/2013 | Chen et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |

(56) References Cited

U.S. PATENT DOCUMENTS

| | | |
|---|---|---|
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,413,781 B2 | 8/2016 | Cunningham et al. |
| 9,560,059 B1 * | 1/2017 | Islam .................... H04L 63/123 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |

(56) References Cited

U.S. PATENT DOCUMENTS

| | | |
|---|---|---|
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1* | 1/2009 | Field ................ G06F 21/53 718/1 |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044272 A1 | 2/2009 | Jarrett |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0197277 A1 | 8/2011 | Figlin et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemel et al. |
| 2011/0247072 A1 | 10/2011 | Staniford et al. |
| 2011/0265182 A1 | 10/2011 | Peinado et al. |

(56) References Cited

U.S. PATENT DOCUMENTS

| | | |
|---|---|---|
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0074770 A1* | 3/2015 | McBeath ............ G06F 21/606 726/4 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0028768 A1* | 1/2016 | Yu ..................... H04L 63/145 726/23 |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 0206928 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J. , et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.-N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").

Silicon Defense, "Worm Containment in the Internal Network", (Mar. 2003), pp. 1-25.

(56) References Cited

OTHER PUBLICATIONS

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

AltaVista Advanced Search Results. "attack vector identifier". Http://www.altavista.com/web/results?Itag=ody&pg=aq &aqmode=aqa=Event+Orch- estrator . . . , (Accessed on Sep. 15, 2009).

AltaVista Advanced Search Results. "Event Orchestrator". Http://www.altavista.com/web/results? Itag=ody&pg=aq &aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Crandall, J.R., et al., "Minos:Control Data Attack Prevention Orthogonal to Memory Model", 37th International Symposium on Microarchitecture, Portland, Oregon, (Dec. 2004).

Deutsch, P., "Zlib compressed data format specification version 3.3" RFC 1950, (1996).

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric, et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase © CMU, Carnegie Mellon University, 2007.

Hjelmvik, Erik, "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc-&ResultC . . . , (Accessed on Aug. 28, 2009).

(56) References Cited

OTHER PUBLICATIONS

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King") (2003).

Krasnyansky, Max, et al., Universal TUN/TAP driver, available at https://www.kemel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].

\* cited by examiner

SUSCEPTIBLE ENVIRONMENT DETECTION SYSTEM

FIELD

Embodiments of the disclosure relate to the field of cyber-security; and more specifically to a system for detecting malware and software environments susceptible to a malicious attack.

GENERAL BACKGROUND

Over the last decade, malicious software has become a pervasive problem for Internet users as many networked resources include vulnerabilities that are subject to attack. For instance, over the past few years, an increasing number of vulnerabilities are being discovered in software that is loaded onto network devices, such as vulnerabilities within operating systems, for example. While some vulnerabilities continue to be addressed through software patches, prior to the release of such software patches, network devices will continue to be targeted for attack by malware, namely information such as computer code that attempts during execution to take advantage of a vulnerability in computer software by acquiring sensitive information or adversely influencing or attacking normal operations of the network device or the entire enterprise network.

Conventionally, malware is configured to activate when it is processed in a generic software environment. However, certain malware may be configured so that malicious behavior is only exhibited when the malware is exposed to a particular software environment. The specific software profiles (e.g., application version, operating system/version, etc.) in which malware is activated—and its behaviors observed during processing—may be referred to as a susceptible software environment.

Unfortunately, conventional malware analysis systems may erroneously output a "false negative" result if the client device, for example, is not operating in the particular software environment(s) that are the target of the malware.

Accordingly, a need exists for an improved malware detection system, apparatus and method that is configured to detect malicious objects by analyzing various "views" with respect to the malicious objects, so as to configure software profiles for use in determining one or more susceptible software environments.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
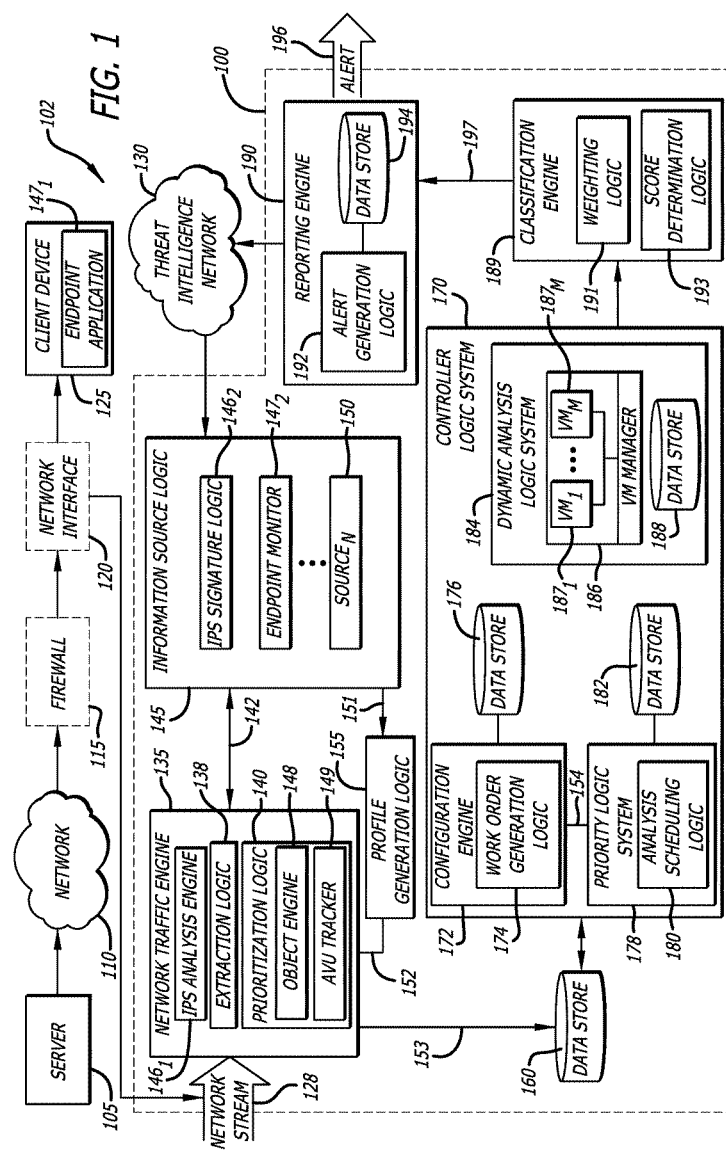
FIG. 1 is an exemplary block diagram of a communication system deploying a susceptible environment detection system via a network.

Embodiments of the present disclosure generally relate to a Susceptible Environment Detection ("SED") system that is configured to utilize context information obtained from multiple information sources (especially, for example, a client device) to generate one or more software profiles to provision one or more virtual machines of a dynamic analysis logic system. In one embodiment, dynamic analysis is scheduled based on priority values that are assigned to the one or more software profiles. The dynamic analysis logic system may be configured to analyze characteristics and/or behaviors of a malicious object and, preferably, determine one or more susceptible software environments. By determining one or more susceptible software environments, the incidence of "false negative" results is reduced.

A. Analyzing an Object Using a Plurality of Information Sources

In general, context information is received and aggregated from any of various information sources to generate one or more software profiles that may be analyzed to determine one or more susceptible software environment.

Indeed, various "views" of a malicious object may be gathered, by way of non-limiting example, using information sources from the network level, application level, etc., without limitation. For example, a network traffic engine may be configured as an information source to extract suspicious objects from network traffic and prioritize further analyses as desired. Similarly, an executable application loaded (e.g., an agent) on a client device may be used to gather specific configuration information details thereto. In one embodiment, the configuration information may include various software profile information, and other device-specific information, such as, for example, the IP address of a client device, domain name(s), username(s), and computer name(s), without limitation.

Moreover, an object engine may be configured to observe and/or extract characteristics of a suspicious object and compare such observed characteristics with those stored on one or more cyber-security databases, such as, for example, a Common Vulnerabilities and Exposures (CVEs) database. Various other sources may be used to gather context information as described herein, without limitation.

In any event, once the various "views" are received and analyzed, various software profiles may be generated using the aggregated context information. In one embodiment, the software profiles may be used as templates that are representative of various combinations, versions, and/or implementations of various software environments, including by way of non-limiting example, various combinations of applications, operating systems, and/or plug-ins.

B. Establishing a Priority Order to Schedule Dynamic Analyses

In embodiments, the generated software profiles may be assigned initial priority values. For example, an initial priority value may be associated with each software profile, which may be used to schedule various analyses using the dynamic analysis logic system. The initial priority values may be representative of rules that have been established/ determined by customers, and/or updated from a central management system, such as a threat intelligence network.

In one embodiment, a configuration engine generates "work orders" based on the one or more software profiles to provision one or more virtual machines of the dynamic analysis logic system. Once the work orders have been generated, analysis scheduling logic may be configured to schedule each of the work orders for analysis, based on the initial priority values. The analysis scheduling logic may update the initial priority values contingent upon system capacity; customer-defined rules (e.g. if only one system is affected by the attack, the priority may be reduced; alternatively, if a high-profile personality is the target of an attack, such as the CEO, the priority may be increased); scheduling rules provided from a remote management console; and the like, without limitation.

Once the final priorities have been established, various characteristics and/or behaviors of the object may be determined. For example, the dynamic analysis logic system may be configured to determine i) maliciousness with respect to the object; and/or, preferably, ii) one or more susceptible environments. If either of the forgoing is determined, an alert is generated.

The alert may signal any of various malware attack types, including without limitation, phishing campaigns, Advanced Persistent Threats (APT), Point-Of-Sales attacks (POS), Crimeware attacks, and the like. Similarly, the alert may feature information regarding the susceptible environments, including, for example, version information with respect to any of various applications, operating systems, and/or plug-ins. In one embodiment, the alert may be used to update one or more client devices or any other aspects of various susceptible environments in real time, based at least in part on the results of the analyses as discussed herein.

I. Terminology

In the following description, certain terminology is used to describe features of the invention.

In certain situations, both terms "logic," "engine" and "component" are representative of hardware, firmware and/or software that is configured to perform one or more functions. As hardware, logic (or engine or component) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine or component) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence the presence of malware and potentially allow the object to be classified as malware.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may include packets, frames, or cells.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); or Simple Mail Transfer Protocol (SMTP); or Internet Message Access Protocol (IMAP); or Post Office Protocol (POP)), or (2) inter-process communications (e.g., Remote Procedure Call "RPC" or analogous processes, etc.). Moreover, the object may be featured with a message as an attachment, for example.

Similarly, as another illustrative example, the object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like. Finally, "object" may also refer to any of various files, including, but not limited to executable programs (file types: .com, .exe, .vbs, .zip, .scr, .dll, .pif, .js), macros (file types: .doc, .dot, .pdf, .ppt, .xls, .xlt), embedded scripts, Hypertext Markup Language (HTML), Uniform Resource Locators (URLs), and the like.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

In certain instances, the term "detected" is used herein to represent that there is a prescribed level of confidence (or probability) on the presence of malware or a malicious attack on an object under analysis.

The term "network device" should be construed as any electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, etc.

The term "computerized" generally represents that any corresponding operations are conducted by hardware in combination with software and/or firmware. Also, the terms "compare" or "comparison" generally mean determining if a match (e.g., a certain level of correlation) is achieved between two items where one of the items may include a particular signature pattern.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Susceptible Environment Detection Methodology

A. General Architecture of a Network Device Deploying Susceptible Environment Detection Logic According to the embodiment illustrated in FIG. 1, the SED system 100 is a network device that is adapted to analyze information associated with network traffic routed over a communication network 110 between at least one server device 105 and at least one client device 125. The communication network 110 may include a public network such as the Internet, in which case an optional firewall 115 (represented by dashed lines) may be interposed on the communication path between the public network and the client device 125. Alternatively, the communication network 110 may be a private network such as a wireless data telecommunication network, wide area network, a type of local area network (LAN), or a combination of networks.

As shown, the SED system 100 may be communicatively coupled with the communication network 110 via a network interface 120. In general, the network interface 120 operates as a data capturing device (sometimes referred to as a "tap" or "network tap") that is configured to receive data propagating to/from the client device 125 and provide at least some of this data to the SED system 100. Alternatively, the SED system 100 may be positioned behind the firewall 115 and in-line with client device 125.

According to one embodiment of the disclosure, the network interface 120 is capable of receiving and routing objects associated with network traffic to the SED system 100. The network interface 120 may provide the entire traffic or a certain subset of the network traffic, for example, such as one or more files that are part of a set of flows, packet payloads, or the like. In some embodiments, although not shown, network interface 120 may be contained within the SED system 100.

As further shown in FIG. 1, the SED system 100 comprises network traffic engine 135, information source logic 145, profile generation logic 155, controller logic system 170, and reporting engine 190. Although the components disposed within the SED system 100 are shown in a communicatively coupled serial configuration, it is envisioned that other topologies may also be implemented, such as, for example, parallel and daisy-chain configurations. It should be appreciated that the network traffic engine 135, information source logic 145, profile generation logic 155, controller logic system 170, classification engine 189 and reporting engine 190 may each be separate and distinct components, but the combination of components may also be implemented in a single block and/or core.

Moreover, it should be understood that the system may feature one or more software modules executed by the same processor or different processors, where these different processors may be located within the same processor package (e.g., different processor cores) and/or located at remote or even geographically remote locations that are communicatively coupled (e.g., by a dedicated communication link) or a network.

As best shown in FIG. 1, the network traffic engine 135 may be positioned and configured to analyze a network stream 128, including various network traffic, and especially Internet and electronic mail message traffic, so that suspicious objects may be extracted using extraction logic 138, and prioritized for further analysis using prioritization logic 140. In other words, in one embodiment, the network traffic engine 135 features software modules that, when executed by one or more processors, receives one or more object(s) for extraction, and prioritized analysis.

As shown, the extraction logic 138 is configured to extract and/or parse potentially malicious objects from network stream 128 for further analysis, using for example, extraction rules based on machine learning and/or experiential knowledge, which may be periodically or a periodically updated from a remote source (e.g., threat intelligence network 130). In one embodiment, the extraction logic 138 may be configured to determine the source of one or more malicious objects, and also whether such objects were communicated via email, file-share, FTP, web download, and the like, without limitation. In one embodiment, however, suspicious objects may be communicated directly to the network traffic engine 135 for further analysis, such that no extraction is required at and/or by the network traffic engine 135.

Moreover, the network traffic engine 135 may feature certain prioritization logic 140, so as to prioritize the extracted, suspicious objects for further analysis, if, for example, certain context information is deemed to be present, such as if certain types of file extensions (e.g., .JS, .SCR, .PDF, and the like) are utilized and/or otherwise attached. In one embodiment, certain scores may be associated with any of various characteristics with respect to the object. Thus, priorities may be determined using the association and comparison of one or more scores. In one embodiment, the prioritization logic may utilize any of various heuristics, probability logic, and/or machine-learning so as to assign priorities to the suspicious objects for further analysis.

To gather context information 151 that is used to generate one or more software profiles 152, various "views" with respect to the potentially malicious object may be analyzed by one or more modules featured in the prioritization logic 140, which in one embodiment may include an object engine 148, and/or an application version update (AVU) tracker 149. In one embodiment, the prioritization logic 140 may also include one or more modules configured to perform a static analysis with respect to the potentially malicious object, so as to identify characteristics and/or anomalous features that may be indicative of maliciousness, without executing the object. For the purposes of convenience, this type of analysis is referred to herein as an IPS analysis, and may be performed, in one embodiment, using an intrusion prevention system ("IPS") analysis engine $146_1$. As such, the IPS analysis engine $146_1$ may conduct heuristics, malware signature checks and/or vulnerability signature checks with regard to some and/or all objects to identify "suspicious" objects having one or more characteristics associated with an exploit. From an implementation standpoint, objects may be analyzed using one or more software modules that feature, in one embodiment, probabilistic logic, heuristic logic, and/or deterministic logic.

More specifically, as shown in FIG. 1, the IPS analysis engine $146_1$ may be configured so as to analyze specific aspects of the network stream 128 for information, including by way of non-limiting example, source IP address information, destination IP address information, source/destination port information and/or the host name so as to generate an alert.

Moreover, the IPS analysis engine $146_1$ may be configured to examine the network stream 128 for known malware and/or vulnerability exploits. It is envisioned that using the IPS analysis engine $146_1$, signature-based detection may be used; that is, detection may be based upon identifiable, and/or previously identified signatures/patterns with respect to various malware. In one embodiment, various signatures may be stored on a data store, such as the data store 160. Additionally or in the alternative, the IPS analysis engine $146_1$ may analyze the network stream 128 by performing one or more checks, including one or more signature checks, which may involve a comparison of (i) content of the network stream 128 and (ii) one or more pre-stored signatures associated with detected malware. Checks may also include an analysis to detect exploitation techniques, such as any malicious obfuscation, using for example, probabilistic, heuristic, and/or machine-learning algorithms.

Accordingly, by way of example, the IPS analysis engine $146_1$ may be adapted to perform vulnerability signature checks, namely a process of uncovering deviations in messaging practices set forth in applicable communication protocols (e.g., HTTP, TCP, etc.). The term "signature" designates an indicator of a set of characteristics and/or behaviors associated with malware which may not necessarily be unique to the malware, as benign objects may also exhibit such characteristics and/or behaviors. Thus, a match of the signature may indicate to some level of probability, often well less than 100%, that the network stream 128 contains a certain malware. In some contexts, those of skill in the art have used the term "signature" as a unique identifier or "fingerprint," for example, of a specific virus or virus family (or other exploit), which is generated for instance as a hash of its machine code, and that is a special sub-case for purposes of this disclosure.

Additionally, or in the alternative, the alert generated by the IPS analysis engine $146_1$ may be communicated to the IPS signature logic $146_2$ to determine, with respect to a specific IP address, meta information associated with the alert, including, for example, one or more identifiers associated with Common Vulnerabilities and Exposures (CVEs)—that is, one or more identifiers for publicly known cyber security vulnerabilities; and information regarding target application versions and other software information without limitation. Thus, in one embodiment, the IPS signature logic $146_2$ may be communicatively coupled to one or more cyber-security databases, such as, for example, a CVE database. It should be understood that any other cyber-security databases may also be used and/or otherwise accessed, without limitation.

In embodiments, the IPS signature logic $146_2$ may be configured to access one or more modules capable of performing real-time traffic analysis, packet logging and/or performing any one of various protocol analyses, content searching/matching, so as to also determine any of various malware attack types, without limitation. It should be understood that even though the IPS analysis engine $146_1$ is shown within the network traffic engine 135, the IPS analysis engine $146_1$ may also be implemented separately and/or remotely from the SED system 100. As such, the generated results of one or more various IPS analyses may be supplied and/or otherwise communicated to the SED system 100, such that the IPS analysis engine $146_1$ is configured at least in part as a receiver with respect to the receipt of such results.

Thus, in one embodiment, metadata associated with the alert may directly influence the generation of one or more software profiles for further analysis using the dynamic analysis logic system 184, as discussed further herein. It should be noted, however, that IPS alerts are conventionally associated with a high rate of "false positive" results. However, as discussed herein, software profiles may be generated based on configuration details that are determined directly from the client device 125, in conjunction with the IPS alert, so as to reduce the incidence of such "false positives." In other words, the SED system 100 may analyze a sample tuple—that is one or more Internet Protocol connection data sets—and generate an alert using the IPS analysis engine $146_1$. The CVEs mentioned in the alert may be used, at least in part, to generate software profiles that are used to provision one or more virtual machines of the dynamic analysis logic system 184. Similarly, the software profiles determined and based, at least in part on the client device 125 may be used to provision one or more virtual machines of the using the dynamic analysis logic system 184. Using these generated software profiles alone or in combination, the IPS alert is significantly more verified, and thereby, the probability of generating a "false positive" result is dramatically reduced. Consequently, it is envisioned that IT administrators and the like can prioritize mitigation steps after the generation of one or more alerts, as discussed herein.

In one embodiment, the object engine 148 may be configured to inspect the object for anomalies in characteristics such as formatting, styles and patterns associated with known malware campaigns and the like. In some embodiments, the object engine 148 may also be configured to analyze the object, wherein such analyses may include, but are not limited or restricted to, analysis of one or more characteristics (hereinafter "characteristic(s)") of or otherwise associated with the object, such as the object's name, object type, size, path, protocols, and/or the like.

Additionally or in the alternative, the object engine 148 may analyze the object by comparing such observed features with those described by CVEs. When matched, a CVE entry may indicate a software profile or components of a software profile that may be susceptible to an exploit. It is contemplated that a CVE entry may only provide information regarding a specific application version that is susceptible to an exploit. As such, a controller logic system 170 (as discussed further herein) may need to combine the application version information with information learned from one or more alternative sources. For example, a second information source may reveal multiple operating system versions that would allow for the generation of one or more software profiles for further analysis. Thus, it should be appreciated that as discussed through various embodiments of the disclosure, information determined from one source may be combined with another source without limitation.

In one embodiment, an object may be analyzed using the object engine 148 so as to determine if one or more "version checks" are performed by the object in an effort to exploit various version-specific vulnerabilities with respect to a system. It should be understood that various malware may be highly customized, and therefore, particular to a specific application and version, for example. More specifically, certain malware may be configured to check a client device to determine which versions of various software are installed thereon, using any of various techniques. Indeed, in one embodiment, only after such version information is detected and corresponding vulnerabilities thereby deduced will one or more malware attacks commence. Thus, it is envisioned that various characteristics with respect to the object may be analyzed to determine if any "version checks" are performed.

Additionally, or in the alternative, the object engine 148 may be configured to determine application version dependencies with respect to the object by extracting corresponding characteristics thereto, or in view of one or more information sources as discussed herein. For example, in one embodiment, the object engine 148 may include one or more emulation logic systems (not shown, as part of a static analysis logic system, for example), that may be configured to observe characteristics of the object and compare such characteristics with various CVEs. Similarly, in one embodiment, the object engine 148 may include one or more dynamic analysis logic systems (not shown in this figure) so as to observe various behaviors exhibited during execution of an object, including, for example, whether the object performs any "version checks" prior to commencing an attack.

Similarly, context information may be gathered using an AVU tracker 149, which may be configured to inspect network traffic specifically for version update information, such as the version number of any update, and the corresponding date of release and/or the most recent date of the last update. For example, in one embodiment, the AVU tracker 149 may determine that an "HTTP GET" request is being communicated from a specific client device to an external server and/or a particular IP address so that one or more software updates may be downloaded. Such network traffic may be highly instructive with respect to current and/or future application version information for software to be run on the requesting client device, for example.

Moreover, updates with regard to various patches and/or service packs may be tracked without limitation. In one embodiment, such network traffic inspection may require the analysis of any of various header or payload parameters and the corresponding storage of such information on a data store, for example. Thus, in one embodiment, software update information may be extracted from the network stream 128 using certain extraction rules, based on experiential knowledge, machine-learning, or the like. Moreover, the extraction rules may be periodically or aperiodically updated from a remote source (e.g., threat intelligence network 130). It should be appreciated that by keeping track of updated and/or current versions of various software applications, the analyses as discussed herein may be more accurate and processed more efficiently, thereby desirably reducing analysis times. More specifically, using the results of the AVU tracker 128, a client's specific software environment may be more accurately simulated and analyzed.

Referring still to FIG. 1, in one embodiment, the network traffic engine 135 may be configured to determine whether an extracted object is suspicious, and thus worthy of further analysis. If the object does not appear to be suspicious, then the analysis may stop. However, if the object appears to be suspicious, then further context information with regard to the object may be determined using a plurality of other information sources, which are represented in FIG. 1 as information source logic 145. In other words, various other "views" may be analyzed with respect to the object. Accordingly, in one embodiment, metadata 142 associated with the suspicious object is communicated to the information source logic 145, so that further contextual information may be determined. Preferably, the metadata 142 may be stored on a data store until or while modules of the information source logic 145 have completed their respective analyses. Similarly, the object and its corresponding metadata 142 may be stored on a data store. It should be appreciated, however, that the various "views" and/or analyses as discussed herein may be considered with regard to one another, in a parallel, serial, and/or recursive fashion, without limitation. In any event, additional context information may be determined using modules of the information source logic 145, which may feature, by way of non-limiting example, the IPS Signature Logic 146$_2$, and an endpoint monitor 147$_2$, which may be communicatively coupled with an endpoint application 147$_1$.

It is contemplated that any number of other relevant source(s)$_N$ 150 may also be included and considered to determine additional context information, without limitation. For example, in one embodiment, functionality (such as, for example, an interactive display or other user device(s)) may be provided to one or more network administrators so that current application version information and/or any other configuration/implementation information with regard to a computing environment may be input directly and stored on one or more data stores. Assuming that such information is updated on a relatively periodic or aperiodic basis, the accuracy of the system may be greatly improved. Moreover, contextual information may be gathered from a plurality of sources at each layer of the Open Systems Interconnection model (OSI model), including by way of non-limiting example, at the application layer, presentation layer, session layer, transport layer, network layer, data link layer and/or the physical layer.

Moreover, in one embodiment, the information source logic 145 may feature an endpoint monitor 147$_2$ that may be configured so as to receive configuration information, such as various details regarding software loaded on the client device 125, from an endpoint application 147$_1$, as shown in FIG. 1 for example. In one embodiment, the software loaded on the client device 125 comprises any of various applications, operating systems, and plug-ins. In one embodiment, the endpoint application 147$_1$ may include a communication link to the information source logic 145, using one or more communication APIs, for example. Thus, bidirectional or unidirectional access may be provided between the endpoint application 147$_1$ and the endpoint monitor 147$_2$ using any of various cloud services. Moreover, in one embodiment, the endpoint monitor 147$_2$ may be configured as a data store, such that the software profile information with respect to the client device 125 may be automatically stored thereon on a periodic or aperiodic basis, via a content management system (not shown), or any other various cloud services. In embodiments, the content management system may gather such information asynchronously from client devices. Additionally, or in the alternative, a network 110 may feature certain rules such that every time a new client device 125 is registered or otherwise accesses the network, the implementation details of the client device 125 may be stored or monitored using the endpoint monitor 147$_2$, in some embodiments, using the content management system as an intermediary.

To be sure, various software profile information regarding specific applications, operating systems and/or plug-ins loaded on the client device 125 may be monitored by the endpoint application 147$_1$ and stored on a separate data store for later access by any of the modules of the SED system 100, and especially the endpoint monitor 147$_2$. In one embodiment, the endpoint application 147$_1$ may feature other antivirus detection and prevention aspects. In one embodiment, the endpoint monitor 147$_2$ may be configured for access through an intermediate node of a network (e.g., a management console and the like, without limitation).

Moreover, in one embodiment, other information sources may be able to communicate with the endpoint monitor 147$_2$ so as to access and/or otherwise retrieve configuration details from the client device 125. By way of illustrative example, the AVU tracker 149 may be configured to communicate with the endpoint monitor 147$_2$ so that configuration details with respect to the client device 125 may be determined and/or stored on one or more data stores.

Similarly, in one embodiment, messages (such as electronic mail messages, SMS, etc.) from the network stream 128 may be of particular interest, and especially messages that include an attachment or otherwise embedded content, such as, by way of non-limiting example, executable and/or non-executable files, URLs, scripts, and the like. By way of illustrative example, electronic mail messages may be analyzed so as to determine various aspects of a client environment, and especially configuration information associated with one or more electronic mail message recipients ("recipient(s)"). In one embodiment, the configuration information includes various details regarding software loaded on the client device 125, such as any of various applications (e.g., an electronic mailing application), operating systems, and plug-ins.

In one embodiment, the electronic mail message may be examined using one or more modules from the network traffic engine 135 to extract one or more recipient identifiers, including for example, the email address of the recipient, or any other meta information that would be instructive with regard to determining software details of the recipient. In an enterprise environment, for example, the recipient identifiers may include an email address and/or user ID of the recipient that may be used to determine configuration information associated with one or more recipients' device(s), which may be stored on a data store, or otherwise accessed using any of various utilities. Also, the recipient identifiers may be used to check a data store maintained by the enterprise (e.g., its IT function) to obtain configuration information corresponding to a client device. In one embodiment, the configuration information associated with one or more client devices 125 (for example) of the recipient are accessed and/or stored so as to generate one or more software profiles for the purposes of provisioning one or more virtual machines of the dynamic analysis logic system 184 as discussed further herein. It is contemplated that the forgoing analyses could also be performed by any other various analyses engines as discussed herein. Moreover, in one embodiment, configuration information that is determined by extracting the one or more recipient identifiers may be input directly to various modules of the controller logic system 170 without limitation.

Now, referring again to FIG. 1, the metadata 142 that has been "viewed" using the various information sources as discussed herein can be combined, aggregated and/or otherwise correlated using any of various techniques to assemble and/or otherwise collect contextual information 151. The contextual information 151 may feature aspects from one or more of the information source(s)$_n$ 150, in various combinations, without limitation. As shown in FIG. 1, the contextual information 151 may be considered an input to the profile generation logic 155, which is configured so as to generate one or more software profiles 152. To be sure, each of the various information sources as discussed herein may be considered independently or in tandem so as to determine and generate software profiles 152 for further analysis. In one embodiment, the context information 151 may represent the results of consolidation of the various metadata 142. Additionally, or in the alternative, only certain metadata 142 is utilized to generate the one or more software profiles 152. Such determinations with respect to which metadata 142 is used may be determined on a case-by-case basis, using experiential knowledge, machine learning, heuristics, and the like, without limitation.

With the high level of granularity based on the various analyses as discussed herein, the software profiles 152 may be configured so as to accurately simulate or mimic a client's actual software environment, along with a number of other potentially susceptible environments. Thus, the software profiles 152 may preferably feature information regarding certain application versions, that may be loaded on a particular device/manufacturer, featuring a certain operating system and/or various plug-ins.

To determine whether an object may be malware that will activate on a client's device, a generated software profile 152 will include the specific implementation of a client's environment—that is—the exact operating system, application and plug-in versions/types that are loaded on the client device 125. In instances where generation of a software profile based on the specific implementation of a client's environment is not feasible or programmed, it is contemplated that a software profile featuring the closest versions with the respect to specific client software implementations may be used and/or generated by the profile generation logic 155. In one embodiment, certain "pre-set" software profiles 152 may be available for use, such that modifications and/or updates thereto may be processed preferably in real-time, or near real-time. In embodiments, software profiles 152 may be implemented using various aspects of U.S. patent application Ser. No. 14/937,802 entitled "System and Method for Multi-Application, Multi-Plugin Analysis for Use in Detecting a Malicious Attack", (filed on Nov. 10, 2015), which is incorporated herein by reference in its entirety. Other software profiles 152 may include various combinations of software versions, etc. so as to ultimately determine one or more susceptible software environments. It is important to note, therefore, that analysis of a single object and/or its corresponding metadata 142 may result in the generation of multiple software profiles 152.

It should be understood that on certain occasions, an object including malware may not "activate" in a first client's software environment for any number of reasons, for example because the first client's device has software versions or configurations that are updated and/or patched with regard to the vulnerabilities that are exploited by the object. However if the first client communicates the object to a second client (such as via electronic mail), and if the second client has a software environment different than the first client, the malware contained in the object may activate in the second client's software environment. It is envisioned, therefore, that generating a plurality of software profiles 152 may desirably assist in identifying an object as being malicious, regardless of the vulnerabilities that are specific to the first client's software environment, for example.

Considering that more than one software profile 152 may be generated with respect to the analyses as discussed herein, it is contemplated that priorities may be assigned to each software profile 152 so that in the event that there is a queue for further analysis, for example, an efficient processing order may be established and preferably stored on the data store 160. For example, when implemented in the field, a particular client may determine that they only care about the maliciousness of an object if there is potential for the object to do harm in their specific computing environment. As such, the software profile 152 associated with the client's environment may be associated with a higher priority as compared with other generated software profiles. In embodiments, it may be desirable to perform a more comprehensive analysis with respect to an object—that is—to analyze all possible combinations of various software profiles so as to determine maliciousness, or some sub-set thereof. Such analyses may be performed using the SED system 100, and/or the threat intelligence network 130.

Accordingly, it is envisioned that in one embodiment, the prioritization logic 140 may be configured to assign initial priorities with respect to the generated software profiles 152. Although the prioritization logic 140 is shown in the network traffic engine 135, it is envisioned that priorities may also be assigned with respect to one or more software profiles using the profile generation logic 155. In one embodiment, the prioritization logic 140 may be configured so as to receive data associated with the one or more software profiles 152 so as to construct a data structure, including by way of non-limiting example, wherein the software profiles are stored in an ordered fashion, e.g., in a hierarchical structure or ordered array, or are each tagged or associated with a priority value, thereby providing a structural representation of priorities associated with the generated software profiles 152. Once the one or more prioritized software profiles 153 have been generated and assigned a priority, they may be communicated and stored on the data store 160, for example.

At the controller logic system 170, one or more work orders may be generated as discussed further herein. In one embodiment, some or all of the data associated with the prioritized software profiles 153 may be automatically communicated to the controller logic system 170. However, it is envisioned that the prioritized software profiles 153 may also be routed to the controller logic system 170 using pull coding, such that the initial request for the prioritized software profiles 153 originates from the controller logic system 170. It should be appreciated, however, that other routing methodologies such as push technologies, or some hybrid of push/pull technologies are within the scope and spirit of the present disclosure.

Referring still to FIG. 1, in one embodiment, the controller logic system 170 features configuration engine 172, priority logic system 178, and the dynamic analysis logic system 184. The configuration engine 172 features work order generation logic 174 that may be configured to generate one or more "work orders" 154 based on the prioritized software profiles 153 that are received from the data store 160. In one embodiment, each work order may feature a specific software profile 153. However, each work order may feature multiple software profiles as well, without limitation. In one embodiment, the controller logic system 170 may receive only a portion of the software profile information (e.g., application version) and may determine additional profile information (e.g., operating system version or other application information) based, in part, on known prior correlations and/or patterns of profiles exhibiting malicious behaviors in the past (i.e., historical or experiential knowledge). This information may be stored on data stores 176 and/or 182, for example, without limitation. It is envisioned that such correlations and/or profiles may be updated from an external source, such as via the threat intelligence network 130, in a periodic or aperiodic manner.

Moreover, certain work orders 154 may be generated even if the various analyses with respect to the object result in a determination that a particular software profile corresponding to a client device 125 is not susceptible (as discussed herein). By way of illustrative example, consider the situation in which a first client receives a malicious object as an attachment via electronic mail, and/or otherwise downloads a malicious object from the Internet. In either case, it is contemplated that the malicious object may be configured so as to exploit one or more vulnerabilities that are not exploitable on the first client's device because the client device has software versions or configurations that are updated and/or patched with regard to the vulnerabilities that are exploited by the malicious object. However, the object engine 148 may observe one or more characteristics that indicate that the object is attempting to target a certain application version, using profiles that mimic other clients' environments within an enterprise, for example. Consequently, it is envisioned that a plurality of work orders 154 may be generated using the embodiments discussed herein.

Thus, because certain targeting characteristics have been determined, one or more work orders 154 may be generated. In one embodiment, a first work order may feature software profile information as determined from the client device 125, for example, using techniques as discussed herein. Moreover, a second work order featuring one or more software profiles may be generated, based at least in part on the information determined by analyzing various "views" with respect to the object, as discussed herein. It should be appreciated that once the second work order is generated and the software profiles therein analyzed, one or more software profiles of the second work order may be marked as malicious. As such, one or more alerts may be generated in embodiments of this disclosure. Therefore, using the techniques as discussed herein, objects observed and/or analyzed in a client environment may be used to determine maliciousness with respect to the client environment, as well as other potentially susceptible environments.

Once the work orders 154 are generated, they may be communicated to the priority logic system 178, so that a final order of analysis may be established with respect to the prioritized software profiles 153. More specifically, analysis scheduling logic 180 may be configured to schedule each of the work orders 154 for dynamic analysis, based in part on the initial priority values. It should be understood, however, that the analysis scheduling logic 180 may update the initial priority values based on a plurality of circumstance-specific details, including, by way of non-limiting example, system resources (capacity and/or bandwidth); customer-defined rules (e.g. if only one system is affected, the analysis priority may be reduced; alternatively, if a high-profile personality is targeted, such as the CEO, the analysis priority may be increased); and scheduling rules provided from a remote management console, and/or network, without limitation. In other words, the analysis scheduling logic 180 may be adapted to update priorities on a case-by-case basis. Moreover, the analysis scheduling logic 180 may determine whether and/or when to conduct a dynamic analysis with respect to a particular software profile relative to other software profiles.

B. General Analysis Methodology

Once a final order of analysis has been established, the various work orders 154 may be analyzed using the dynamic analysis logic system 184. Herein, the dynamic analysis logic system 184 comprises a virtual machine manager 186, a data store 188 and one or more virtual machines (VMs) 187, namely $VM_1$ $187_1$-$VM_M$ $187_M$ (M≥1) that may be configured to perform in-depth dynamic analysis with respect to one or more work orders 154. In general, the dynamic analysis logic system 184 is adapted to provision one or more VMs $187_1$-$187_M$ (e.g., $VM_1$-$VM_M$) to determine one or more susceptible software environments using the work orders 154 as discussed herein. Moreover, malware behaviors may be observed by simulating one or malicious objects within one or more run-time environments as expected based on the type of object.

More specifically, the dynamic analysis logic system 184 may observe behaviors with respect to the object, in order to make one or more determinations with respect to maliciousness. Using the dynamic analysis logic system 184, certain artifacts with respect to a type of malware attack may be analyzed. For example, dynamic analysis logic system 184 may consider propagation mechanisms of the object, to determine how instructions and/or behaviors associated with the object communicate or navigate across and/or through a network, for example. More specifically, the dynamic analysis logic system 184 may consider how an object behaves to determine one more susceptible software environments using one or more software profiles as discussed herein. Consequently, it is important to note that the dynamic analysis logic system 184 may be configured to determine i) one or more susceptible environments; and ii) one or more malicious behaviors with respect to the object.

In one embodiment, the dynamic analysis logic system 184 comprises a plurality of rules that may be stored on the data store 188, for example, wherein the rules may be applied to object(s) to determine compliance thereto. The rules may be based on experiential knowledge, including but not limited to machine learning; pattern matches; heuristic, probabilistic, or determinative analysis results; analyzed deviations in messaging practices set forth in applicable communication protocols (e.g., HTTP, TCP, etc.); analyzed compliance with certain message formats established for the protocol (e.g., out-of-order commands); and/or analyzed header or payload parameters to determine compliance. It is envisioned that the rules may be updated from an external source, such as via the threat intelligence network 130, in a periodic or aperiodic manner.

According to one embodiment, each of the VMs 187 (e.g., $VM_1$-$VM_M$) within the dynamic analysis logic system 184 may be configured with a software profile corresponding to a software image stored within the data store 188 that is communicatively coupled with the virtual machine manager 186. Additionally, or in the alternative, the VMs 187 (e.g., $VM_1$-$VM_M$) may be configured according to one or more prevalent software profiles and/or configurations, used by a network device within a particular enterprise network (e.g., client device 125), or any specific environment, and/or any specific version that is associated with the object to be processed, including software such as a web browser application, PDF™ reader application, PowerPoint™ application, or the like.

However, it should be understood for a known vulnerability that the VMs 187 (e.g., $VM_1$-$VM_M$) may be more narrowly configured to profiles associated with vulnerable modules. For example, if the access source is attempting to access a particular application, email address book, etc., then $VM_1$-$VM_M$ 187 may be configured accordingly.

The classification engine 189 may be configured to receive VM-based results from the dynamic analysis logic system 184, for example. According to one embodiment of the disclosure, the classification engine 189 comprises weighting logic 191 and score determination logic 193. The weighting logic 191 may be configured to apply weighting to results provided from the dynamic analysis logic system 184. Thereafter, the classification engine 189 may route the classification results 197 comprising the weighting applied to the VM-based results to the reporting logic engine 190. The classification results 197 may, among others, classify any malware detected into a family of malware, describe the malware, describe and/or identify one or more susceptible software environments (e.g., susceptible software profiles), and provide metadata associated with any object(s) and/or environments within which the malware were detected.

In the event that i) one or more susceptible environments; and/or ii) one or more malicious behaviors with respect to the object are determined, the alert generation logic 192 of the reporting engine 190 may generate an alert for the client device 125 and/or route the alert to the threat intelligence network 130 for further analysis. In addition, the alert may be routed to the communication network 110 for further analysis by a network administrator, for example. The reporting engine 190 may issue an alert 196 (e.g., an email message, text message, display screen image, etc.) to security administrators for example, communicating the urgency in handling one or more predicted attacks.

The alert 196 may trigger a further analysis of the object. The reporting engine 190 may be configured so as to store analysis results in the data store 194 for future reference. Specifically, the data store 194 may be configured so as to track malicious actions and vulnerabilities, and correlate such data with the context information 151. Moreover, once one or more susceptible environments are detected, various information with regard to the one or more software profiles may be stored on the data store 194, for example. Moreover, the threat intelligence network 130 may be updated with such information so that the specific configurations and/or combinations of software profiles in which malware behavior was detected may be relied upon and/or accessed for future purposes. In one embodiment, the IPS Signature Logic $146_2$ may be updated so that the most recent signatures are available for future reference.

Preferably, the reporting engine 190 may include instructions and/or information that may be used to rapidly (and in some embodiments, in real-time) cause one or more susceptible environments to be updated, by way of application updates, operating system updates, plug-in updates, and the like, without limitation. In one embodiment, such instructions and/or information may be communicated to the threat intelligence network 130, so that any other networks and/or client devices that are communicatively coupled to the threat intelligence network 130 may be similarly updated.

Finally, the reporting engine 190 may issue an alert or report 196 (e.g., an email message, text message, display screen image, etc.) to security administrators for example, communicating the urgency in handling and preferably preventing one or more predicted attacks. The alert 196 may also include detailed instructions pertaining to specific attack types, potential issues thereto, security holes, and best practices to prevent one or more predicted malware attacks. It should be appreciated that the reporting engine 190 may also be configured to update the threat intelligence network 130 with information corresponding to the instantly analyzed object for future reference and/or further processing.

Figure 2:
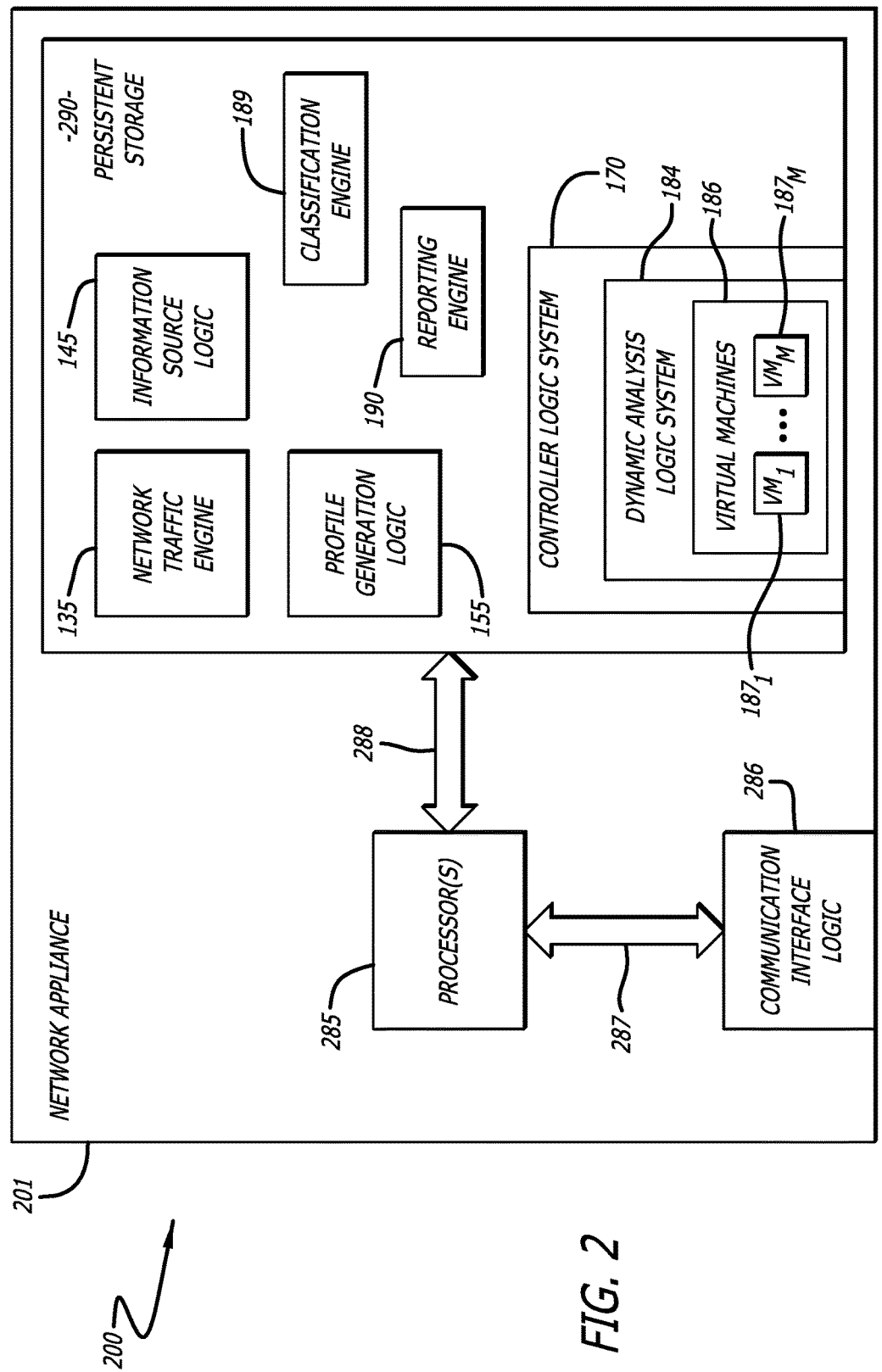
FIG. 2 is an exemplary embodiment of a logical representation of the Susceptible Environment Detection system of FIG. 1.

Referring now to FIG. 2, an exemplary embodiment of a representation of the SED system 100 of FIG. 1 is shown. In one embodiment, a network appliance 200 may feature a housing 201, which is made entirely or partially of a rigid material (e.g., hardened plastic, metal, glass, composite or any combination thereof) that protect circuitry within the housing 201, namely one or more processors 285 that are coupled to communication interface logic 286 via a first transmission medium 287. Communication interface logic 286 enables communications with other SED systems 100 and/or the threat intelligence network 130 of FIG. 1, for example. According to one embodiment of the disclosure, communication interface logic 286 may be implemented as a physical interface including one or more ports for wired connectors. Additionally, or in the alternative, communication interface logic 286 may be implemented with one or more radio units for supporting wireless communications with other electronic devices.

Processor(s) 285 may further be coupled to persistent storage 290 via a second transmission medium 288. According to one embodiment of the disclosure, persistent storage 290 may include the SED system 100, which in one embodiment comprises (a) network traffic engine 135; (b) information source logic 145; (c) profile generation logic 155; (d) reporting engine 190; (e) controller logic system 170; (f) dynamic analysis logic system 184; and (g) classification engine 189. It is envisioned that one or more of these systems (or logic units) could be implemented externally from the SED system 100 without extending beyond the spirit and scope of the present disclosure.

Although not illustrated, it is contemplated that all or a portion of the functionality of the susceptible environment detection system may be deployed at part of cloud services. For instance, dynamic analysis logic system may be deployed in cloud services, which conducts behavioral analysis on an object. Alternatively, at least some functionality of the controller logic system may be deployed within cloud services. Therefore, it is within the spirit of the invention that the susceptible environment detection system may reside entirely within a single network appliance, or may be deployed as a decentralized system with different functionality being handled by different network devices, including cloud services.

C. General Architecture of a Mobile Device Deploying an Endpoint Application

Figure 3:
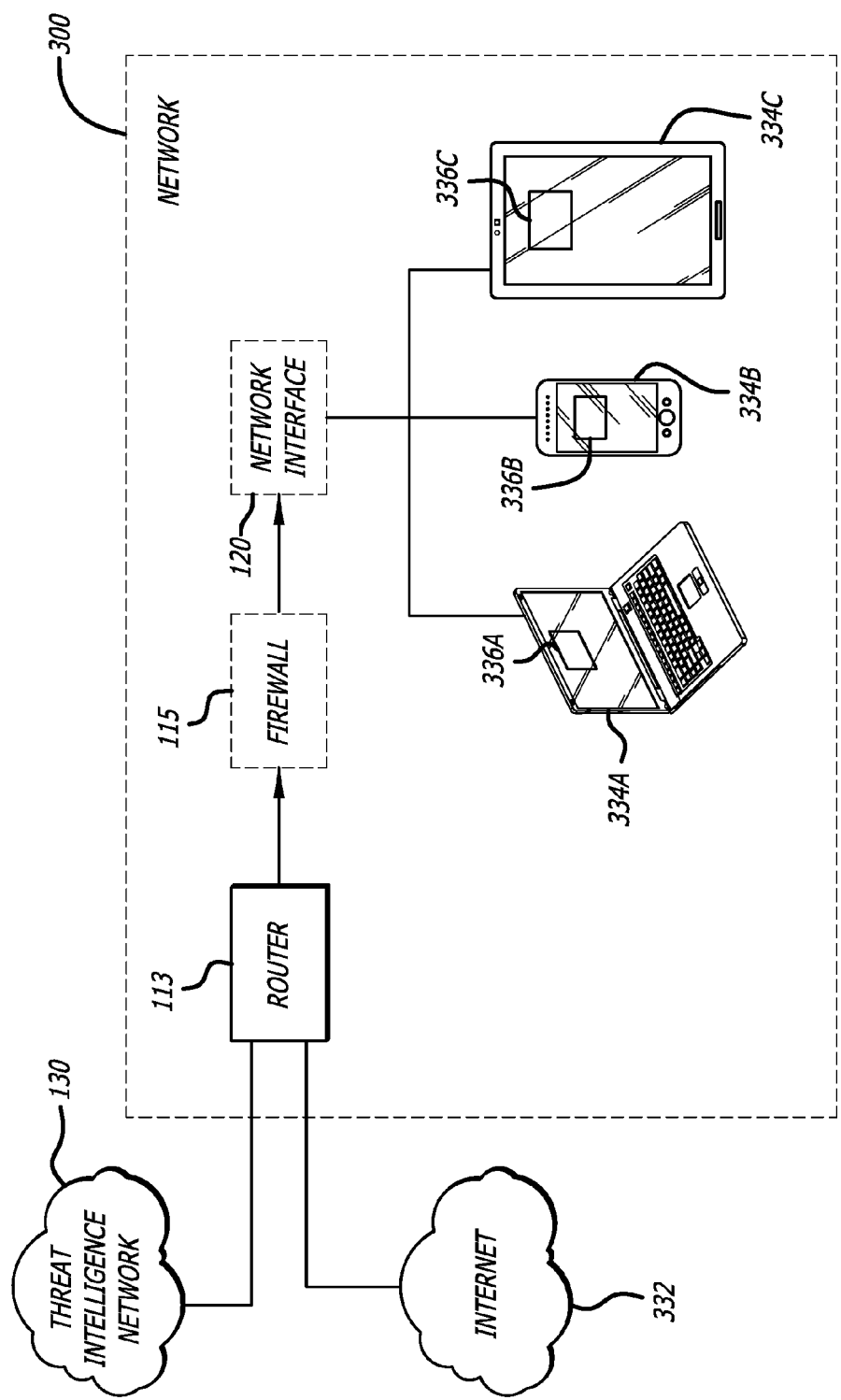
FIG. 3 is an exemplary representation of a plurality of mobile devices deploying an endpoint application communicatively coupled to a network.

Referring to FIG. 3, a plurality of mobile devices 334A-334C deploying an endpoint application 336A-336C is shown, communicatively coupled to the threat intelligence network 130. In general, a network environment 300 is shown, wherein a router 113 is communicatively coupled to the threat intelligence network 130 and Internet 332. The router is also communicatively coupled to an optional firewall 115, which itself may be communicatively coupled to a network switch 120. As shown, the plurality of mobile devices 334A-334C may also be communicatively coupled to the threat intelligence network 130 and Internet 332 using any transmission medium, including without limitation, wireless and hardwired connection schemes. It is envisioned that an exemplary endpoint application 336A-336C corresponding to each of the mobile devices may be installed to detect software profiles and ultimately determine one or more susceptible software environments. Of course, although only three mobile devices 334A-334C are shown in FIG. 3, any number of devices may have the exemplary endpoint application 336A-336C loaded thereon. In one embodiment, the SED application may be a downloaded from an app store, web site, etc., and thus stored and made locally available with respect to a mobile device.

Figure 4:
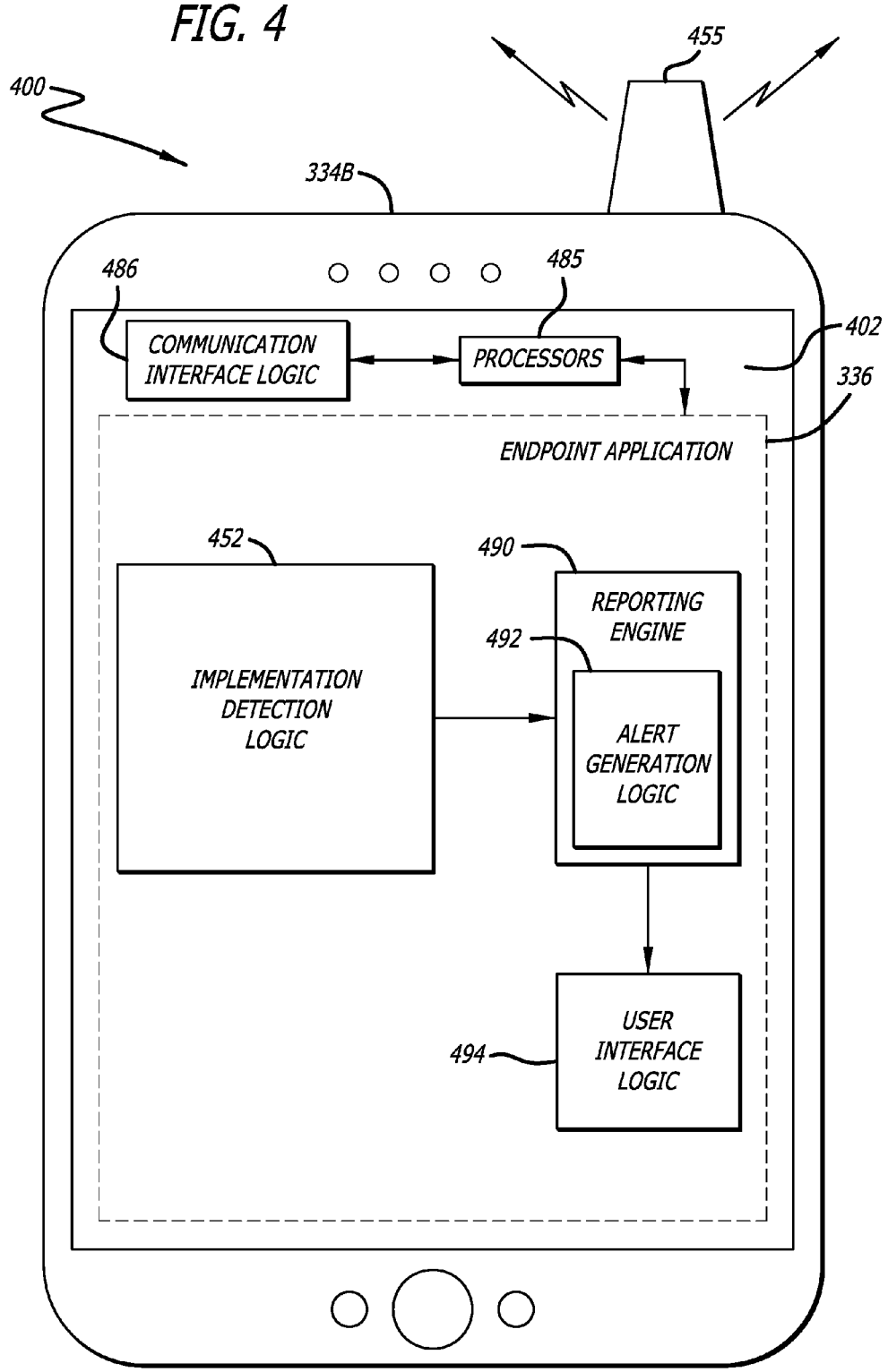
FIG. 4 is an exemplary embodiment of a mobile device deploying an endpoint application according to the present disclosure.

Referring to FIG. 4, a mobile device 400 may be configured to deploy the endpoint application 136 of FIG. 3. As shown in FIG. 4, for illustrative purposes, the network device 400 is represented as a mobile device (e.g., smartphone, tablet, laptop computer, netbook, etc.). The mobile device 400 includes a display screen 402, one or more processors 485, a receiver and/or transmitter (e.g. transceiver) such as an antenna 455, and communication interface logic 486. In one embodiment, the endpoint application 336 comprises implementation detection logic 452, reporting logic 490, and user interface logic 494.

As shown, the endpoint application 336 communicates the output of the implementation detection logic 452 directly to the SED system 100 for further analysis. In one embodiment, the implementation detection logic 452 may be configured to track and/or otherwise store information regarding specific implementation details of the device 400, including the software loaded and/or running on the device. For example, such information may include, by way of non-limiting example, software types/versions, operating system types/versions, and or information regarding one or more plug-ins. In one embodiment, it is envisioned that the endpoint application 336 may be in operable communication with the endpoint monitor 147$_2$ of the SED system 100. As such, the endpoint application 336 may be considered to be substantially similar to the endpoint application 147$_1$ of FIG. 1. Once the analysis of an object is complete as discussed herein, for example using the SED system 100, the results may be communicated to the reporting engine 490, such that an alert or report (e.g., an email message, text message, display screen image, etc.) is generated to security administrators or the user, for example, communicating the urgency in handling one or more predicted attacks using the user interface logic 494.

Figure 5:
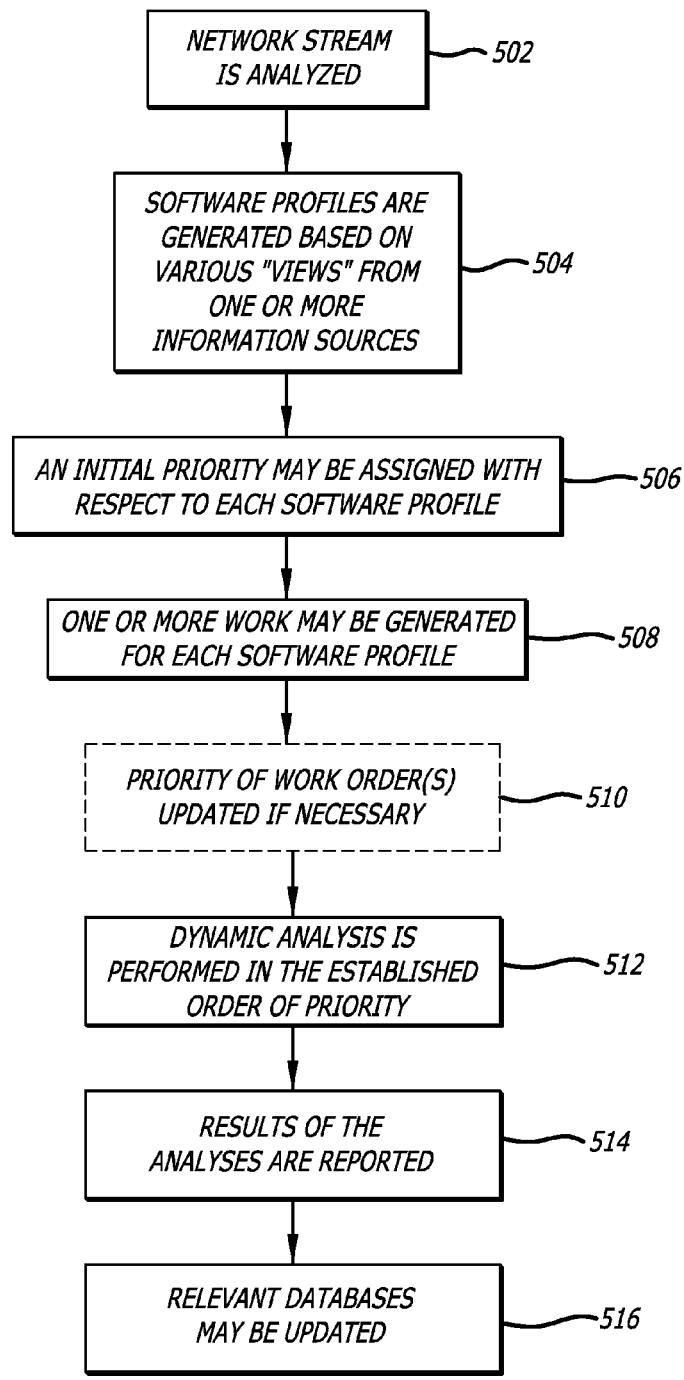
FIG. 5 is a flowchart of an exemplary method for configuring a dynamic analysis system using a plurality of information sources to determine a susceptible software environment.

Referring now to FIG. 5, a flowchart of an exemplary method for configuring a dynamic analysis system using a plurality of information sources to determine a susceptible software environment is shown. For example, at block 502, network traffic is analyzed, using the network traffic engine 135, for example. At block 504, one or more software profiles are generated based on context information derived from analyzing various sources of information. More specifically, various "views" of a suspicious object may be gathered from the network level, application level, etc., so as to determine appropriate software profiles for use in monitoring malicious behaviors of an object. It is envisioned that various modules may also serve as information sources, as discussed herein. At block 506, an initial priority value may be associated with each software profile, which may be stored on data store 160. The initial priority values may be representative of rules that have been established/determined by customers, and/or updated from a central management system, such as a threat intelligence network 130.

At block 508, the configuration engine 172 may generate "work orders", such that each work order describes one or more proposed software profiles. At block 510, analysis scheduling logic 180 may be configured to schedule each of the work orders for dynamic analysis, based on the initially assigned priorities. However, the analysis scheduling logic 180 may update the initial priorities contingent upon system capacity; customer-defined rules; scheduling rules provided from a remote management console; and the like, without limitation. In other words, the analysis scheduling logic 180 may be used to establish a final priority order with respect to the behavioral analysis of one or more software profiles.

At block 512, once the final order of analysis has been established, the dynamic analysis logic system 184 may analyze the various work orders 154 in order of priority. In one embodiment, it is envisioned that various work orders may be concurrently run in the same virtual machine, or concurrently run in a plurality of virtual machines so as to determine i) maliciousness with respect to the object; and/or ii) one or more susceptible environments. The results of the virtual machines may then be classified, using weighting logic and/or score determination logic, for example, as discussed herein. At block 514, if maliciousness is confirmed with regard to the object; and/or one or more susceptible environments, an alert 196 is generated. The alert may correspond to any of various malware attack types, including without limitation, phishing campaigns, Advanced Persistent Threats (APT), Point-Of-Sales attacks (POS), Crimeware attacks, and the like. Moreover, the information regarding the susceptible environments may include certain version information with respect to any of various applications, operating systems, and/or plug-ins. Finally, at block 516, relevant data stores may be updated in view of the determined susceptible environments and/or malicious objects.

D. Exemplary Alert

Figure 6:
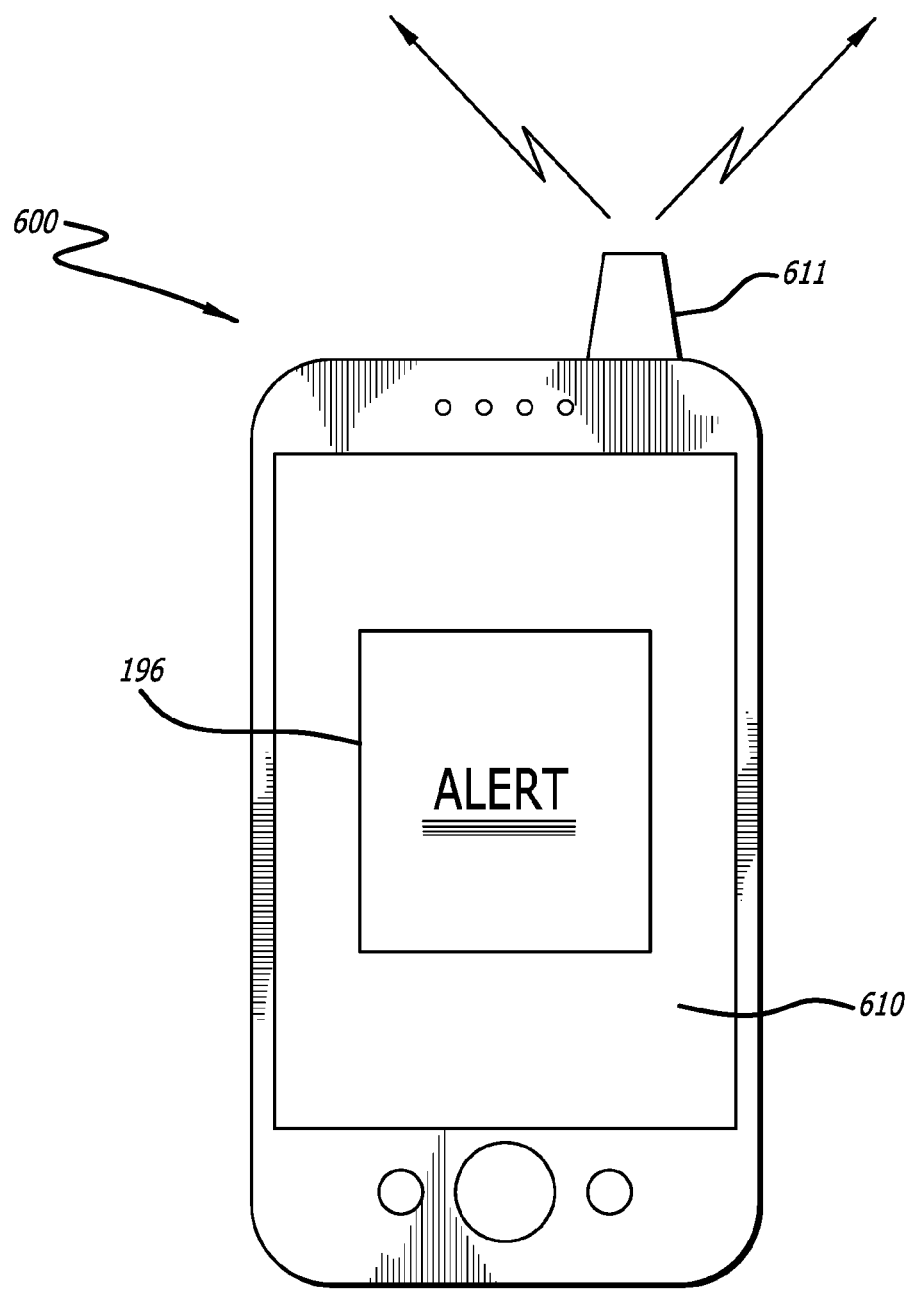
FIG. 6 is an exemplary network device demonstrating an alert according to the present disclosure.

Referring to FIG. 6, a network device may be configured to receive an alert or report 280. In FIG. 6, for illustrative purposes, the network device is represented as a mobile network device 600 (e.g., smartphone, tablet, laptop computer, netbook, etc.). The mobile network device 600 includes a display screen 610; a receiver and/or transmitter (e.g. transceiver) such as an antenna 611.

In one embodiment, the exemplary alert 196 (e.g., an object, text message, display screen image, etc.) is communicated to security administrators for receipt/viewing on the mobile network device 600. For example, the exemplary alert 196 may indicate the urgency in handling one or more attacks based on the maliciousness of the object 128. Furthermore, the exemplary alert 196 may comprise instructions so as to prevent one or more predicted malware attacks. The exemplary alert 196 may also comprise information with respect to the origination of the potential attack, along with suspicious behavior that might confirm the attack with respect to a potential target. In one embodiment, the exemplary alert 196 may include scores and/or threat levels based on the various examination techniques as discussed herein. Moreover, the alert 196 may feature information regarding the susceptible environments, including, for example, version information with respect to any of various applications, operating systems, and/or plug-ins.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method, comprising:
analyzing a plurality of information sources to determine context information with respect to an object, wherein at least a first information source of the plurality of information sources comprises configuration information determined from a client device;
generating one or more software profiles based on the context information, the one or more software profiles being used to provision one or more virtual machines of a dynamic analysis logic system;
generating one or more work orders corresponding to the one or more software profiles;
assigning a priority order to the one or more work orders;
scheduling each of the one or more virtual machines to conduct, in accordance with the assigned priority order, a dynamic analysis of the object;
performing the one or more dynamic analyses of the object by the one or more virtual machines that produce results, each result from a dynamic analysis of the one or more dynamic analyses identifies a susceptible software environment including a susceptible software profile and one or more anomalous behaviors of the object during processing;
classifying the object as malware based, at least part, on the results of the one or more dynamic analyses; and
generating an alert comprising details determined at least in part from the results of the one or more dynamic analyses.

2. The computerized method of claim 1, wherein the details of the alert include i) information that identifies the malware, and ii) information regarding the susceptible software environment.

3. The computerized method of claim 2, wherein the alert may be used to update the client device, the susceptible software environment of the client device, and a threat intelligence network in real time.

4. The computerized method of claim 1, wherein the plurality of information sources comprise an object engine and at least one of an endpoint application and an application version update tracker.

5. The computerized method of claim 4, wherein the application version update tracker is configured to inspect a network stream to determine information specific to updates with respect to the client device.

6. The computerized method of claim 4, wherein the object engine is configured to observe characteristics of the object and compare the observed characteristics to characteristics stored on one or more cyber-security databases.

7. The computerized method of claim 4, wherein the endpoint application is configured to report the configuration information.

8. The computerized method of claim 7, wherein the configuration information comprises details regarding software loaded on the client device, wherein the software comprises any of various applications, operating systems, and plug-ins.

9. The computerized method of claim 1, wherein the priority order may be updated prior to the dynamic analysis using at least one of system capacity, customer-defined rules, and scheduling rules.

10. The computerized method of claim 4, wherein the plurality of information sources further comprise version information with respect to a computing environment that is input by one or more network administrators.

11. A system configured to analyze an object, comprising:
one or more processors;
a memory communicatively coupled to the one or more processors, the memory to store logic that, when executed by the one or more processors, to
generate one or more software profiles based on the context information, the one or more software profiles being used to provision one or more virtual machines of a dynamic analysis logic system;
generate one or more work orders corresponding to the one or more software profiles;
assign a priority order to the one or more work orders;
schedule each of the one or more virtual machines to conduct, in accordance with the assigned priority order, a dynamic analysis of the object;
perform the one or more dynamic analyses of the object by the one or more virtual machines that produce results, each result from a dynamic analysis of the one or more dynamic analyses identifies a susceptible software environment including a susceptible software profile and one or more anomalous behaviors of the object during processing;
classify the object as malware based, at least part, on the results of the one or more dynamic analyses; and
generate an alert comprising details determined at least in part from the results of the one or more dynamic analyses.

12. The system of claim 11, wherein the details of the alert include i) information that identifies the malware, and ii) information regarding the susceptible software environment.

13. The system of claim 12, wherein the alert may be used to update one or more client devices or the susceptible software environment in real time.

14. The system of claim 11, wherein the logic comprises an object engine and at least one of an endpoint application and an application version update tracker.

15. The system of claim 14, wherein the application version update tracker is configured to inspect a network stream to determine information specific to updates with respect to a client device.

16. The system of claim 14, wherein the object engine is configured to observe characteristics of the object and compare the observed characteristics to characteristics stored on one or more cyber-security databases.

17. The system of claim 14, wherein the endpoint application is configured to report configuration information determined from a client device.

18. The system of claim 17, wherein the configuration information comprises details regarding software loaded on the client device, wherein the software comprises any of various applications, operating systems, and plug-ins.

19. The system of claim 11, wherein a threat intelligence network is updated based on information regarding the one or more susceptible environments.

20. The system of claim 11, wherein the priority order may be updated prior to the dynamic analysis using at least one of system capacity; customer-defined rules; and scheduling rules provided from a remote management console.

* * * * *